April 10, 1928.  
E. F. MAAS  
1,665,889  
CHAFING STRIP APPLIER  
Filed March 16, 1926  
2 Sheets-Sheet 1
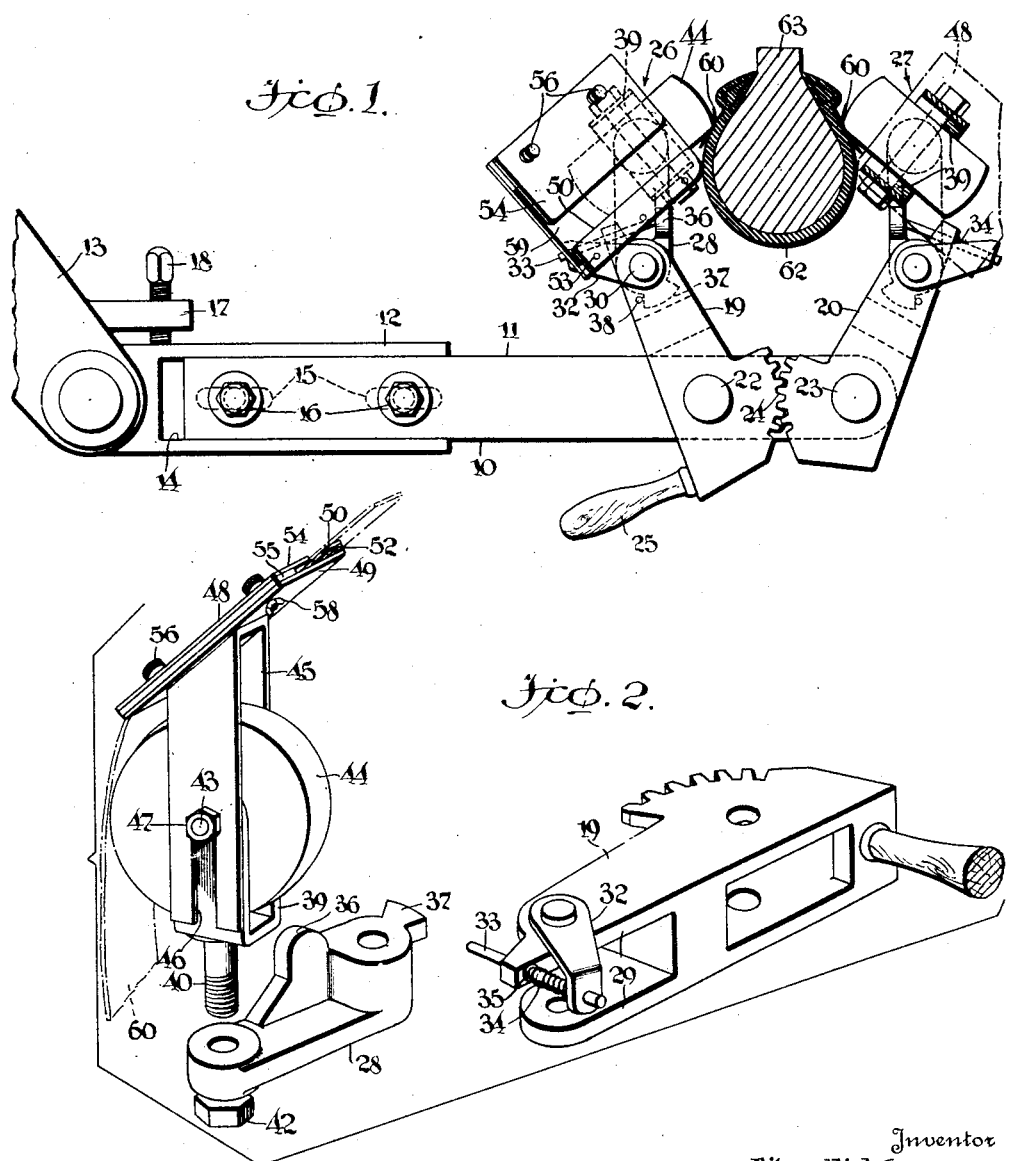
Inventor  
Elov F. Maas, April 10, 1928.                     E. F. MAAS                        1,665,889
                              CHAFING STRIP APPLIER
                              Filed March 16, 1926              2 Sheets-Sheet 2
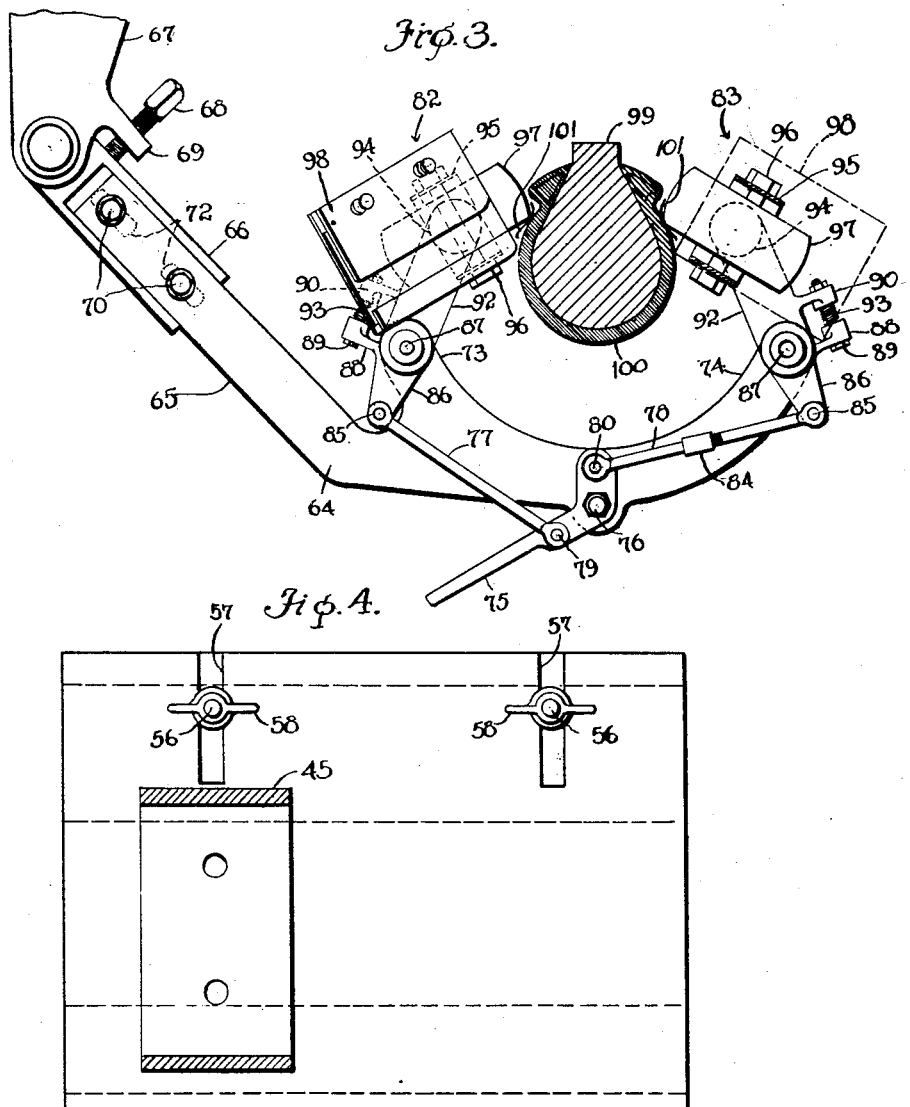
Inventor
Elov. F. Maas.
By
                                                                    Attorney Patented Apr. 10, 1928.

1,665,889

UNITED STATES PATENT OFFICE.

ELOV F. MAAS, OF AKRON, OHIO, ASSIGNOR TO THE GOODYEAR TIRE & RUBBER COMPANY, OF AKRON, OHIO, A CORPORATION OF OHIO.

CHAFING-STRIP APPLIER.

Application filed March 16, 1926. Serial No. 95,043.

My invention relates to apparatus employed in building pneumatic tire casings, and it has particular relation to an attachment for a tire-building machine which facilitates the application of rubberized fabric strips to pneumatic tire carcasses.

One object of my invention is to provide an apparatus that is adapted to be employed in connection with tire-building machines, which will enable an operator to build a materially increased number of tires in a given time by saving time and labor incident to the building of such tires.

Another object of my invention is to provide an apparatus which will simultaneously apply a plurality of chafing strips to a tire carcass with a minimum expenditure of manual labor and time, and which will insure uniform application of such chafing strips to the carcasses.

In the manufacture of pneumatic tires, plies or bands of rubberized fabric are applied upon a rigid annular core, and are stitched together by means of disc rollers to form a tire carcass. Usually, after the first fabric band is applied to the core, annular bead members are pressed into proper position against the sides of the carcass and additional plies of fabric are then applied to and stitched upon the first band by means of the disc rollers. After the tire carcass has been built thus far, relatively narrow chafing strips are applied circumferentially thereof adjacent the beads and are adapted to be lapped under the toe or bead portion of the tire. A rubber tread is then applied to the carcass, the edge portions of which usually extend to the beads and overlap the chafing strips.

Heretofore, it has been customary to apply chafing strips to a tire carcass by manually positioning them circumferentially adjacent the bead portion of the carcass. It was necessary to apply each chafing strip separately upon each side of the carcass, and lines were marked upon the carcass to serve as guides for the tire builder for properly positioning the strip. It will be apparent that the manual application of chafing strips entailed considerable tedious work and considerable skill was required on the part of the workmen to effect uniform application of these strips.

By the employment of an apparatus constructed according to my invention, a tire builder is only required to place the chafing strips upon the guides of the apparatus provided therefor, which extend on opposite sides of the tire, whereupon they will be mechanically fed to and stitched into their proper positions on the tire carcass. Briefly, this apparatus consists of a hinged arm pivotally mounted upon a tire building machine and provided with a pair of interconnected pivoted levers which are adapted to be moved toward and away from the sides of a rotatable tire building core.

Rollers are journalled to the levers and engage the tire carcass along the line where the chafing strips are to be applied. Also special guides are provided on the roller supports, and by starting chafing strips through the guides against the carcass, and by pressure exerted against one of the interconnected levers, the strips are uniformly pressed into proper position about the beads of the carcass. Thereafter the strips are firmly stitched to the carcass by means of the disc rollers employed in stitching the plies together.

For a better understanding of my invention, reference may now be had to the accompanying drawings forming a part of this specification, of which;

Fig. 1 is a plan view of an apparatus embodying one form which my invention may assume, parts thereof being omitted for the sake of clearness;

Fig. 2 is an exploded perspective view on an enlarged scale illustrating in detail the principal elements of the apparatus;

Fig. 3 is a plan view embodying another form which my invention may assume; and

Fig. 4 is an enlarged view, partially in elevation and partially in section, showing details of construction of one of the guide members employed in a machine embodying my invention.

In practising my invention I provide a hinged arm 10 composed of an outer section 11 and an inner relatively adjustable section 12, the latter being pivoted to a projection 13 forming a part of a well known type of tire building machine. The adjustable section 12 is provided with a channel 14 into which the outer section 11 fits, and is slotted, as indicated at 15, for the purpose of receiving bolts 16 secured adjacent one end of the section 11 and adapted to be secured at various positions within slots, in order to vary the length of the arm 10. At one side of the hinged arm, a lug 17 formed on the projection 13 is provided with a set screw or bolt 18 which is adjustable to limit the swinging movement of the arm 10.

Two levers 19 and 20 are pivoted, as indicated at 22 and 23, adjacent the outer end of the arm section 11, the levers being interconnected by means of segmental gearing 24, which permits them to be swung about their pivot points in opposite directions. A handle 25 is secured to the lever 19 and serves to swing both levers simultaneously in opposite directions. The levers 19 and 20 pivotally support two roller-and-guide mechanisms 26 and 27, which are identical, and therefore a detailed description of one of them will be sufficient for a thorough understanding of their operation and structure.

The roller-and-guide mechanism 26 is provided with a member 28, one end of which is inserted between jaws 29 provided at the end of the lever 19, as best shown in Fig. 2, and which is held in proper position by means of a pivot bolt 30. In order to control movement of the member 28, an angular plate 32 secured to the end of the lever is adapted to slidably receive a pin 33. The pin 33 is also slidably mounted in the lever 19 adjacent the end thereof and supports a spring 34 bearing against the plate and against an enlargement or collar 35 on the pin. The enlargement prevents the pin from slipping through the end of the lever. An intermediate portion of the member 28 is provided with an integral abutment lug 36, which is adapted to engage the end of the pin under pressure of the spring 34. An extension 37 on the end of the member 28 engages a stop pin 38 disposed through the jaws 29 and limits the pivotal movement of the member 28 in the direction opposite to that in which the spring 34 acts.

The outer end of the member 28 supports a U-shaped bracket 39 rigidly secured thereto by means of a bolt 40 which receives a clamping nut 42. The upper portion of the U-shaped bracket 39 is provided with a bearing bolt 43 on which a roller 44 is journalled and which also supports an inverted U-shaped bracket 45 disposed over the flanges of the first named U-shaped bracket.

Adjacent the sides of the U-shaped bracket 39, the bearing bolt 43 is adjustable in a slot 46 formed in the lower portion of the inverted U-shaped bracket, the latter being clamped in adjusted position by a clamping nut 47. The upper portion of the inverted U-shaped bracket is inclined and rigidly supports an inclined guide member 48, the lower edge of which overhangs the roller 44. This guide member comprises a main plate 49 provided adjacent one edge, with a narrow plate 50 spaced therefrom by a strip 52, these plates being secured together by means of bolts or screws 53 (Fig. 1). Adjacent the other edge of the main plate 49, a second relatively narrow plate 54 is spaced therefrom by a strip 55. The last named narrow plate is provided with adjusting bolts 56 disposed within slots 57 (Fig. 4) formed in the edge of the main plate 49 and adjustable therein by means of clamping wing nuts 58. Thus a guide channel 59 is formed which may be varied in width by sliding the plate 54 upon the main plate 49 and clamping the plates together in the desired adjusted position.

A tire builder inserts a chafing strip 60 within the channel 59 and permits one end thereof to hang adjacent the roller 44 (Fig. 2). It is to be understood that the same construction of the guide member is employed in connection with the guide-and-roller mechanisms 26 and 27, although the guide plate for the mechanism 27 is indicated only in outline by dot and dash lines (Fig. 1).

After the chafing strips are in proper position, as above indicated, the handle 25 is pressed to pivot the lever 19 in a clockwise direction and the rollers 44 consequently press the chafing strip into engagement with a tire carcass 62 built on a rotatable building core 63. The springs 34 provide yieldable engagement between the rollers and the tire carcass. By rotating the core, the chafing strips are uniformly applied circumferentially on each side of the carcass. Of course it is to be understood that the chafing strips are subsequently permanently stitched to the carcass in the conventional manner well known to the tire art.

It will be observed that the adjustment permitted by the set screw 18 and the bolt 16 provides for the application of chafing strips to tires of various sizes and the rollers in their adjusted positions always apply such strips in their proper position on the various sizes of tire carcasses.

An apparatus embodying my invention in the form shown in Fig. 3 functions in substantially the same manner as the one above described. In this form of my invention, a hinged arm 64 composed of an outer section 65 and an inner adjusting section 66 mounted upon an element 67 of a tire building machine, is limited in its swinging movement by a set screw 68 threaded in a lug 69. Also the sections are adjustable by means of bolts 70 which clamp the sections together and are disposed in slots 72 formed in the adjusting section.

The outer end of the section 65 is provided with two integral curved projections 73 and 74 and a bell crank lever 75 is pivoted at its elbow, as indicated at 76, intermediate the ends of the projections. At opposite sides of the elbow pivot point 76, two rods 77 and 78 are pivoted upon bolts 79 and 80, and extend toward the respective ends of the projections 73 and 74. These rods are connected to and actuate roller-and-guide mechanisms 82 and 83, only one of which will be described in detail, as the respective operating parts thereof are identical. Also like numerals will be employed to designate identical elements.

The rod 78 is provided with a turnbuckle 84, which permits relative adjustment of the two guide mechanisms. The outer end of the rod 77 is pivoted at 85 to one end of a link 86, the other end of the link being pivoted at 87 to the end of the projection 73. An intermediate portion of the link 86 is provided with an integral lug 88, to which a bolt 89 is secured, the latter being slidable through a lug 90 formed on a bracket 92. The ends of a spring 93 surrounding the bolt 89 engage the respective lugs 88 and 90. One end of the bracket 92 is also pivoted at 87 to the end of the projection 73. The other end of this bracket, as indicated at 94, rigidly supports a U-shaped roller support 95 provided with a bearing bolt 96, a roller 97, and a guide 98. The structure of this U-shaped member 95, together with the structure of the roller 97 and guide member 98, is identical in every respect with the structure described in connection with the U-shaped brackets 39, roller 44, and guide 48. Therefore, further description of these members is not deemed to be necessary.

The hinged arm 64 is adjusted and swung into proper position with respect to a rotatable core 99 having a tire carcass 100 built thereon, and by pressure against the lever 75 in a clockwise direction, the roller-and-guide mechanisms 82 and 83 are swung inwardly to cause the rollers 97 to yieldably engage the tire carcass against the tension of the spring 93. Chafing strips 101 are applied to the tire in the same manner as above described in connection with the operation of the apparatus shown in Figs. 1 and 2.

From the foregoing description, it will be apparent that I have provided an apparatus which is of great value in the art of building tire casings because of its efficiency in reducing the manual operations incident to application of chafing strips to tire carcasses and because of the time and labor saved in the employment of the apparatus.

Although I have illustrated but the preferred forms which my invention may assume and have described those forms in detail, it will be apparent to those skilled in the art that it is not so limited but that various minor modifications and changes may be made therein without departing from the spirit of my invention or from the scope of the appended claims.

What I claim is:

1. An attachment for a tire building machine having a carcass supporting core mounted thereon, a swinging bracket mounted adjacent the core, a pair of interconnected arms pivoted to the bracket and adapted to operate on opposite sides of the core, spring pressed roller members secured to the arms for engaging the tire carcass supported by the core, and individual guides mounted on the arms for directing strips of fabric under the rollers.

2. An attachment for a tire building machine having a carcass supporting core mounted thereon, a swinging bracket mounted adjacent the core, a pair of interconnected movable arms provided with spring pressed rollers adapted to engage opposite sides of the core, and a guide member mounted on each of said arms adjacent the rollers for directing strips of material over the rollers against the carcass supported by the core.

3. An attachment for a tire building machine having a carcass supporting core mounted thereon, a swinging bracket mounted adjacent the core, a pair of stitcher arms pivoted to the bracket and having segmental gear connections between them, yieldable members carried by the arms having means for engaging the tire carcass supported on the core, and guides positioned upon said members.

4. An attachment for a tire building machine having a carcass supporting core mounted thereon, a movable bracket mounted adjacent the core, a pair of interconnecting arms pivoted to the bracket, members having yieldably mounted rollers journalled thereon for engaging opposite sides of the core, means for pivoting the members to the arms and guide members mounted upon said members adjacent the rollers for directing strips of material over the rollers against the sides of the carcass of the tire.

5. A chafing strip applying attachment for tire machines having a rotatable tire core comprising a bracket pivotally mounted for swinging movement toward or away from the core, arms pivoted to the bracket, means for simultaneously swinging the arms towards or away from each other, stitcher disc supports movably mounted on the arms and having spring means for yieldably holding them in predetermined position on the arms, and stitcher discs and chafing strip guides mounted on the supports and adapted to be brought adjacent the sides of the tires by movement of the bracket.

6. A chafing strip applying attachment for tire machines having a rotatable tire core, comprising a bracket movably mounted with respect to the core, a pair of arms resiliently supported upon the bracket, stitcher discs mounted upon the arms, chafing strip guides positioned upon the arms adjacent the stitcher discs and means for simultaneously swinging the arms toward or away from each other.

7. A chafing strip applying attachment for tire making machines having a rotatable tire core, comprising a pair of arms adapted to be positioned adjacent the core, means for swinging the arms simultaneously toward the sides of the core, resilient means permitting a slight relative movement of the arms independently of each other, stitcher discs mounted upon the arms and adapted to engage the sides of a tire upon the core, and chafing strip guides mounted upon the arms and adjustable to direct the chafing strips beneath the stitcher discs.

In witness whereof, I have hereunto signed my name.

ELOV F. MAAS.